No. 844,953.
PATENTED FEB. 19, 1907.
C. MONROE.
FILTER FOR COFFEE POTS.
APPLICATION FILED MAY 19, 1906.
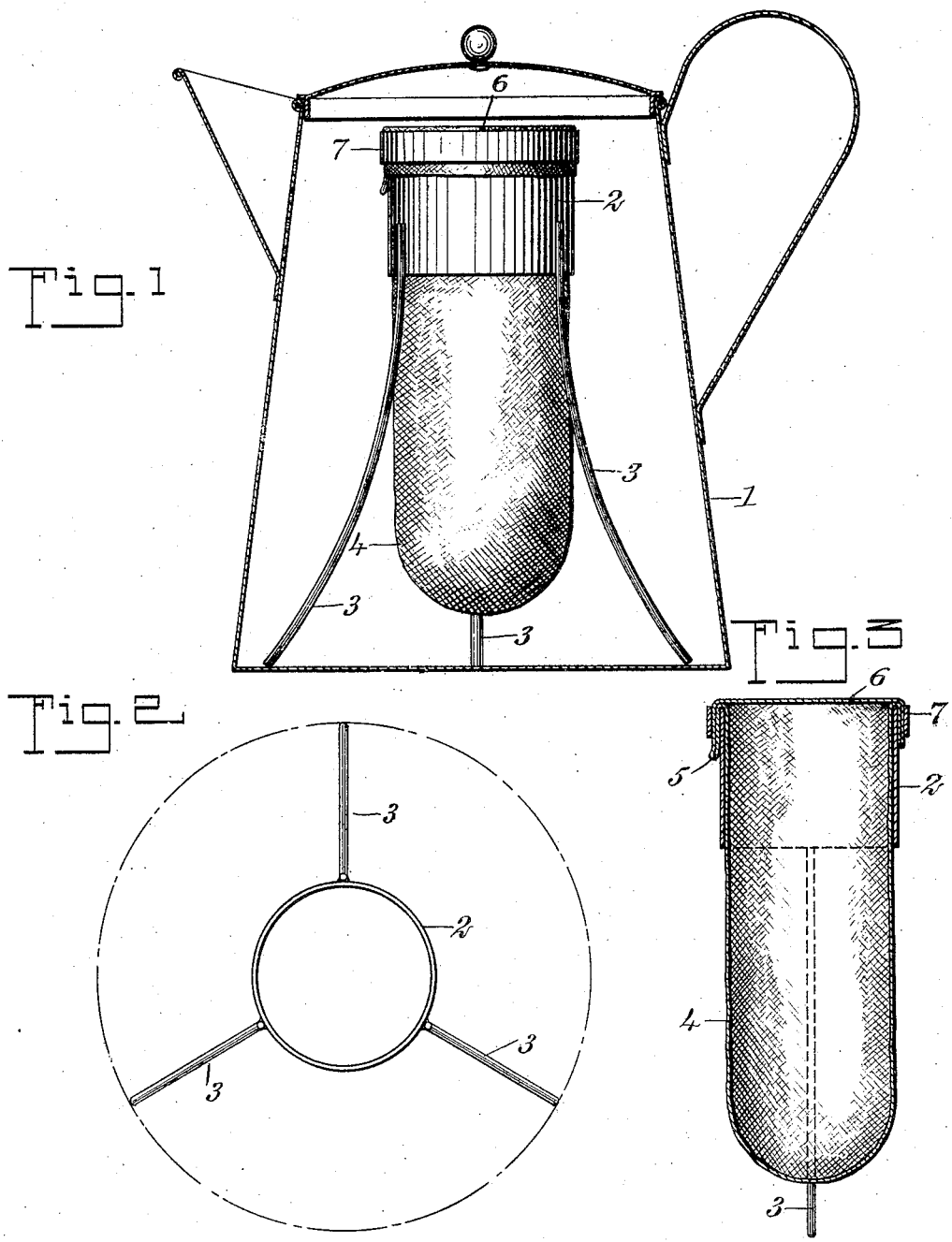
WITNESSES
INVENTOR
Clarence Monroe
BY
ATTORNEYS

UNITED STATES PATENT OFFICE.

CLARENCE MONROE, OF LOVELAND, COLORADO.

FILTER FOR COFFEE-POTS.

No. 844,953.          Specification of Letters Patent.          Patented Feb. 19, 1907.

Application filed May 19, 1906. Serial No. 317,791.

*To all whom it may concern:*

Be it known that I, CLARENCE MONROE, a citizen of the United States, and a resident of Loveland, in the county of Larimer and State of Colorado, have invented a new and Improved Filter for Coffee-Pots, of which the following is a full, clear, and exact description.

This invention is an improved coffee-pot filter having, among other objects, the provision of a comparatively inexpensive device of this character comprising a filter-bag which can be removed and cleaned with facility and readily replaced, and also to provide a porous cover for the bag, which will admit of the passage of the steam and water, but prevent the coffee-grounds from passing into the pot.

To this end the invention consists of a tubular body supported on suitable legs in the coffee-pot, forming the holder for the filter-bag. The filter-bag is made of a thin textile, as muslin or the like, having an open end to which is attached a cover of the same material. The bag is inserted in the tubular body with the edges thereof about its open end folded over the outside of the tube, as also the edges of the cover. These are held in place by a band which passes over them and binds the bag and cover between it and the tube against accidental displacement.

Reference is to be had to the accompanying drawings, forming a part of this specification, in which similar characters of reference indicate corresponding parts in all the figures.

Figure 1 is a side elevation of my improved filter, showing the same as disposed in a coffee-pot. Fig. 2 is a plan view of the stand or bag-holder, showing the outline of the pot in dotted position; and Fig. 3 is a longitudinal central sectional view of my improvement.

Referring to the drawing figures, the numeral 1 indicates a coffee-pot of any desired formation in which my invention is adapted to be used.

2 is a tubular body, forming a holder, supported in an upright position near the top of the pot on outwardly-flared wire legs 3, secured to it by soldering or otherwise and giving the tube 2 a firm base, from which it will be difficult to unseat.

Adapted to be removably secured to the tube 2 is a cloth bag 4, reaching to near the bottom of the pot when fixed in operative relation. This bag is made from a thin textile with an open upper end attached at one edge, as at 5, to a cover 6 of the same material. The edges about the open end of the bag, together with the edge of the cover 6, which latter is of sufficient diameter to permit it, are folded over the upper edge of the tube 2 after the bag has been lowered in position and are clamped together by a snugly-fitting retaining-band 5.

In the operation of my improvement the ground coffee is placed in the bag or sack and the latter fixed to the support, as shown in Fig. 3. The whole is then set in any form of coffee-pot of a size suitable to contain it—for example, as shown in Fig. 1. By now pouring boiling water into the pot or filling the pot to any desired height with cold water and boiling it the water percolates through the bag and extracts the strength from the coffee in a well-known manner.

In cleaning the bag it is only necessary to withdraw the band 7 to release the edges of the bag and cover, which permits very easy withdrawal and replacement when desired. The cover 6 is a very important feature of my invention in that it admits of the ready passage of the steam through the top of the bag, but pervents the coffee-grounds from getting into the pot—as, for example, by the coffee boiling up over the top of the bag.

Having thus described my invention, I claim as new and desire to secure by Letters Patent—

1. A filter for coffee-pots, comprising a tubular body, outwardly-flared wire legs attached to said body for supporting it, a bag with an open upper end made from a thin textile, a cover of the same material attached at one side of the open end of the bag, the edges of the bag and cover being folded over the upper edge of the tubular body, and a metal band passing over the edges of the bag and cover and binding them against the tubular body.

2. A filter for coffee-pots comprising a tubular body, a textile bag open at its upper end and passing through the body with the edges thereof folded over upon the exterior of the body, a textile cover covering the open end of the bag and also having its edges folded over upon the exterior of the body, and a band passed over the folded edges of the bag and cover and bindingly engaging them with the body.

In testimony whereof I have signed my name to this specification in the presence of two subscribing witnesses.

CLARENCE MONROE.

Witnesses:
 ISAAC J. MEADE,
 MAUD E. MORGAN.